United States Patent [19]

Osborne et al.

[11] 4,155,107
[45] May 15, 1979

[54] GENERATOR EARTH FAULT PROTECTION

[75] Inventors: Colin T. Osborne; Roger J. Gilbert, both of, Bradford, England

[73] Assignee: Lucas Industries Limited, Great Britain

[21] Appl. No.: 869,436

[22] Filed: Jan. 16, 1978

[30] Foreign Application Priority Data

Jan. 18, 1977 [GB] United Kingdom ............... 1831/77

[51] Int. Cl.² ............................................. H02H 7/06
[52] U.S. Cl. ...................................... 361/20; 361/21; 361/42
[58] Field of Search ....................... 361/18, 20, 21, 42

[56] References Cited

U.S. PATENT DOCUMENTS

| 3,248,608 | 4/1966 | Farkas et al. | 361/21 |
| 3,535,589 | 10/1970 | Bourgeault | 361/21 |

Primary Examiner—Harry E. Moose, Jr.
Attorney, Agent, or Firm—Kane, Dalsimer, Kane, Sullivan and Kurucz

[57] ABSTRACT

A generator set includes a main generator, a permanent magnet pilot alternator, a rectifier assembly connecting the pilot alternator output to first and second supply rails, a relay having a contact, and a regulator for the main generator having a semi-conductor output element, the output element, the field winding and the contact being connected in series between the first and second supply rails. A power supply circuit is transformer coupled to the pilot alternator and provides a stabilized power supply both for the regulator and the relay, such power supply circuit having an earthed terminal. A resistor is connected between the second supply rail and the earth terminal, so as to limit fault current in the event of an earth fault in the connection between the contact and the field winding.

3 Claims, 1 Drawing Figure

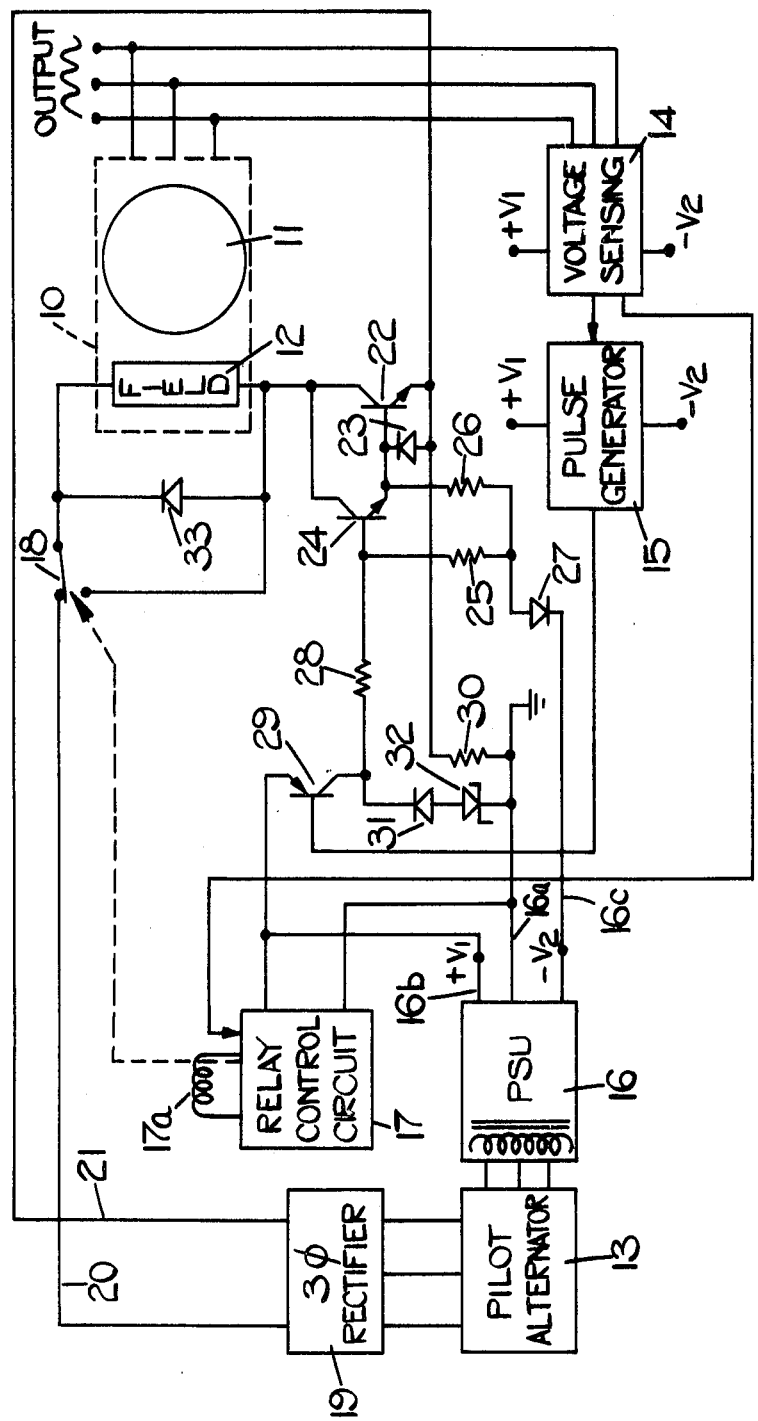

GENERATOR EARTH FAULT PROTECTION

This invention relates to generator sets of the basic kind comprising a main generator having a field winding and a permanent magnet pilot generator for supplying power to the main generator field winding.

In such a generator set the permanent magnet pilot generator conventionally provides power for the field winding through a rectifier assembly and also provides power to a power supply circuit feeding various control functions of the generator set. Thus a main voltage regulator circuit connected to sense the output of the main generator may draw its power from the power supply circuit, said regulator circuit driving a semi-conductor switch element in series with the main field winding. In addition the field winding may be connected to the rectifier assembly via a relay which is controlled by a circuit powered by the power supply circuit.

With such an arrangement a problem can arise if an earth fault arises in the conductors connecting the relay to field winding. Such a fault can cause a fault current to flow which overloads the permanent magnet generator to such an extent that the relay drops out, interrupting the fault current. The fault is then isolated from the control circuits and the pilot generator recovers, re-energising the relay and once more completing the fault current path. This cycle can repeat until some damage results which puts the set out of operation.

It is an object of the invention to provide such a generator set with circuits arranged to provide protection against such a condition.

In accordance with the invention there is provided a generator set comprising a main generator, having a field winding, permanent magnet pilot alternator, a rectifier assembly connecting to the pilot alternator output to first and second supply rails, a relay having a contact, a regulator for the main generator having a semiconductor output element, said field winding, said contact and said output element being connected in series between said first and second supply rails, said output element being controlled in accordance with the main generator output to modulate the current in the field winding, a power supply circuit for the relay and the regulator, which is a.c. coupled to the pilot alternator output and provides a power supply having an earthed terminal and a resistor connected between said earthed terminal and said second supply rail so as to limit the fault current which can flow when there is an earth fault in the connection between the relay contact and the field winding.

An example of the invention is shown in the accompanying drawing which is a somewhat diagrammatic representation of a generator set in accordance with the invention.

The set shown includes a main generator 10 having a stator winding 11 and a field winding 12 and producing a three phase output.

A permanent magnet pilot alternator 13 is provided to produce power for feeding current to the field winding 12 of the main generator and also to provide a power supply to a regulator circuit and protective relay circuit for the main generator.

The regulator circuit is shown in several separate parts in the drawing, namely a voltage sensing circuit 14 which has input terminals connected to the main generator output and a pulse generator circuit which produces, in known manner, a pulsed output controlled by the voltage sensing circuit 14. For example the circuit 14 may produce a d.c. output with a superimposed ripple at a multiple of the main generator output frequency. In this case the generator 15 is required to produce a continuous high voltage output if the main generator output is above a first predetermined level, a continuous low output if the main generator output is below a second predetermined level and a variable mark-space ratio pulsed output at the ripple frequency when the main generator output is between these levels. Other circuit arrangements can, of course, be used for the sensing and pulse generating circuits 14 and 15.

Power for the circuits 14 and 15 is derived from a power supply circuit 16 a.c. coupled to the pilot alternator output by a transformer and this power supply circuit has an earthed terminal 16a, a terminal 16b at a positive voltage $+V_1$ and a further terminal 16c at a negative voltage $-V_2$.

The protective relay circuit referred to includes a relay control circuit 17 provided with power from the power supply circuit 16 and including a relay 17a operating a contact 18. The relay control circuit 17 receives an input from the voltage sensing circuit 14 to indicate a main generator output overvoltage condition and is tripped by such an input into a locked out condition to shut down the main generator 10 as will become clear from the following description.

A three phase bridge rectifier 19 is connected to the pilot alternator output and provides a voltage between two supply rails 20 and 21. The relay contact 18, the field winding 12 and the collector-emitter path of an npn power transistor 22 forming the output element of the regulator are connected in series between the rails 20, 21.

The drawing also shows the output stage of the regulator including the transistor 22. As shown the emitter of this transistor 22 is connected to the rail 21 and its collector is connected to one end of the field winding 12. The base of the transistor 22 is connected to the cathode of a diode 23 the anode of which is connected to the rail 21. An npn driver transistor 24 has its emitter connected to the base of the transistor 22, and its collector connected to the collector of the transistor 22. Two resistors 25, 26 are connected in series between the base and emitter of the transistor 24 and have their common point connected to the anode of a diode 27, the cathode of which is connected to the $-V_2$ terminal 16c. The base of the transistor 24 is also connected by a resistor 28 to the collector of a pnp transistor 29 which has its emitter connected to the $+V_1$ terminal 16b and its base connected to the pulse generator 15.

A low ohmic value resistor 30 connects the rail 21 to the earthed terminal 16a of the circuit 16. A diode 31 has its cathode connected to the collector of the transistor 29 and its anode connected to the anode of a zener diode 32 which has its cathode connected to the earthed terminal 16a.

In normal use the relay 17a is energised and holds the contact 18 in the position shown. De-energisation of the relay 17a causes the contact 18 to move to a position in which it breaks the connection to the rail 20 and short-circuits the field winding. In normal running the transistor 22 is turned on and off to maintain the desired main generator output, a recirculating diode 33 connected across the field winding 12 coping with field current whilst the transistor 22 is off.

In the event of an earth fault on the connection between contact 18 and the field winding 10, fault current flows to earth from the rail 20 through the contact 18, but has to flow through the resistor 30 in its return path to the rectifier 19 via the rail 21. The immediate effect of this is to limit the earth fault current to a level such that the pilot alternator 13 is not overloaded thereby preventing unwanted dropping out of the relay 17a, which would not be latched by such dropping out and would therefore be energised again as soon as opening of contact 18 reduced the fault current sufficiently to allow recovery of the pilot alternator. Clearly rapidly repeated making and breaking of an earth fault current would cause severe damage to the contact 18. The fault current limitation imposed by the resistor 30 therefore prevents this harmful oscillatory condition from existing.

In addition, the circuit shown also utilizes the resistor 30 as part of an earth fault detection circuit to shut down the generator properly. This earth fault detection function arises from the use of the diode 31 and zener diode 32. The fault current through the resistors 30 causes the voltage on line 20 to fall several volts below earth potential so that base current for the transistor 24 can be drawn via the zener diode 32 and the diode 31 from terminal 16a thereby over-ridingly turning on the transistors 24 and 22. The continuous field current thus provided causes the main generator output to rise eventually tripping the circuit 17 to open contact 18 and lock out, thereby causing complete shut down of the main generator whilst the pilot generator output is unaffected.

The resistor 30 also provides fault current limitation in the event of an earth fault on terminal 16b, although shut down does necessarily not then occur.

Diode 27 prevents the collapse of the power supply $-V_2$ during an earth fault due to the excessive base current demand of transistor 24 via resistors 25 and 26. Under these conditions transistor 24 derives its base current via zener diode 32, diode 31 and resistor 28 as described above.

We claim:

1. A generator set comprising a main generator having a field winding, permanent magnet pilot alternator, a rectifier assembly connecting to the pilot alternator output to first and second supply rails, a relay having a contact, a regulator for the main generator having a semiconductor output element, said field winding, said contact and said output element being connected in series between said first and second supply rails, said output element being controlled in accordance with the main generator output to modulate the current in the field winding, a power supply circuit for the relay and the regulator, which is a.c. coupled to the pilot alternator output and provides a power supply having an earthed terminal and a resistor connected between said earthed terminal and said second supply rail so as to limit the fault current which can flow when there is an earth fault in the connection between the relay contact and the field winding.

2. A generator set as claimed in claim 1, in which said relay is connected to a voltage sensing circuit forming part of the regulator and is arranged to be tripped when the main generator output exceeds a predetermined voltage, said regulator including means sensitive to the establishment of fault current in said resistor for energising said semiconductor output element continuously so as to cause tripping of the relay.

3. A generator set as claimed in claim 2 in which the output element is a transistor having its emitter connected to said second supply rail and the regulator also includes a driver transistor connected with the output transistor as a Darlington pair, said means sensitive to the fault current comprising a diode and a zener diode in series between the earth terminal and the base of said driver transistor, said diode and said zener diode conducting when the voltage across said resistor exceeds a predetermined level.

* * * * *